US006437971B1

(12) United States Patent
Rane et al.

(10) Patent No.: US 6,437,971 B1
(45) Date of Patent: Aug. 20, 2002

(54) INTERFACE FOR AUXILIARIES USED WITH PLUG-IN BASE

(75) Inventors: Mahesh Jaywant Rane, Bangalore; Janakiraman Narayanan, Hosur; Tirumani Govinda setty. Phaneendra, Bangalore; ShachiDevi Tumkur Krishnamurthy, Bangalore; Pavan Ramachandra Vitthal Kashyap, Bangalore; Chandrappa Namitha, Bangalore; Chandrakumar Shantaraju, Bangalore, all of (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/725,417

(22) Filed: Nov. 29, 2000

Related U.S. Application Data

(60) Provisional application No. 60/190,748, filed on Mar. 20, 2000.

(51) Int. Cl.$^{7}$ .................................................. H02B 1/06

(52) U.S. Cl. ........................ 361/673; 361/600; 361/679

(58) Field of Search ......................... 200/293, 295–297; 335/202; 361/644–647, 600, 679, 634–636, 652–656, 673; 439/212–214

(56) References Cited

U.S. PATENT DOCUMENTS 4,752,233 A * 6/1988 Morby et al. ............... 439/212

FOREIGN PATENT DOCUMENTS

| | | |
|---|---|---|
| DE | 79 27 344 U | 12/1979 |
| EP | 0 881 727 A | 12/1998 |
| FR | 0595730 | 5/1994 |

* cited by examiner

*Primary Examiner*—Gregory Thompson
(74) *Attorney, Agent, or Firm*—Cantor Colburn LLP

(57) ABSTRACT

An interface for a plug-in circuit breaker for carrying auxiliary components is disclosed. The interface includes a substrate having a base surface secured to the circuit breaker and a mounting surface. A plurality of auxiliary contact blocks, each carrying eight auxiliary contacts, can be mounted on the mounting surface. A plurality of rating plugs, for avoiding insertion of a wrong breaker into a plug-in base, may further be mounted on the mounting surface. The interface may further include a plurality of tunnel-shaped passageways for routing auxiliary circuit wires and preventing their interference with moving parts of the breaker.

22 Claims, 1 Drawing Sheet

INTERFACE FOR AUXILIARIES USED WITH PLUG-IN BASE

CROSS REFERENCE TO RELATED APPLICATIONS

This application is based upon, and claims the benefit of, U.S. Provisional Patent Application No. 60/190,748 filed on Mar. 20, 2000, which is herein incorporated by reference in its entirety.

BACKGROUND OF THE INVENTION

The present invention relates to circuit breakers, and more particularly relates to the mounting of auxiliary components upon a breaker base.

Auxiliaries, such as secondary contact disconnect, rating error prevention, and locator for safety trip, are mounted directly on a breaker base. The mounting surface space in compact breakers is extremely limited. This imposes restriction on the number of auxiliary components that can be mounted and used with the breakers. Their fitment is often very difficult and unreliable. The routing of auxiliary circuit wires is critical as it might interfere with the moving parts.

BRIEF SUMMARY OF THE INVENTION

In an exemplary embodiment of the invention, an auxiliary component interface for a circuit breaker is disclosed including a substrate having a base surface adapted for attachment to a base of a circuit breaker, a mounting surface adapted for mounting auxiliary components, and an external periphery. A plurality of substrate screw apertures are located within the substrate for accepting screws. An auxiliary contact block may be mounted to the mounting surface of the substrate. The auxiliary contact block is adapted to carry eight auxiliary contacts and has an auxiliary contact block screw aperture for aligning with a substrate screw aperture. Other features of the interface include passageways for auxiliary circuit wire routing and rating plugs.

DETAILED DESCRIPTION OF THE INVENTION

Figure 1:
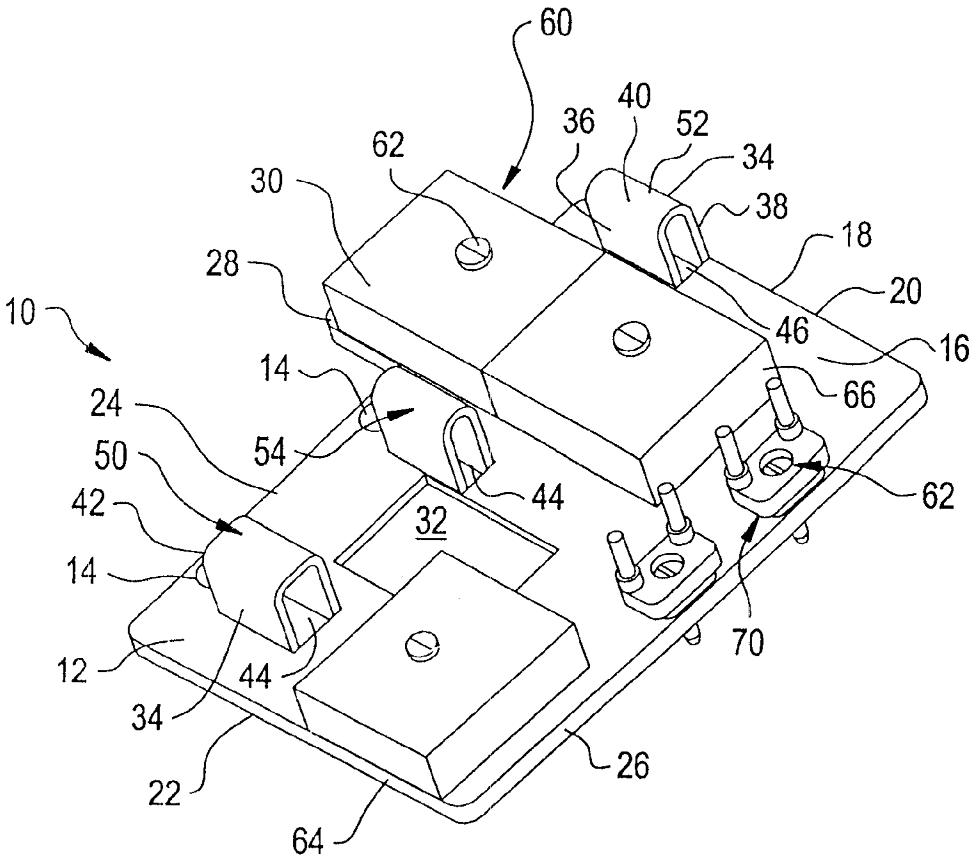
FIG. 1 shows a perspective view of the intermediate component assembly of the present invention; and, FIG. 2 shows a perspective view of the intermediate component assembly of FIG. 1 mounted on a breaker base.

As shown in FIG. 1, the intermediate component assembly or auxiliary component interface 10 of the present invention comprises a generally flat platform or substrate 12. The substrate 12 may be provided with screw holes 14 to securely attach the interface 10 to a circuit breaker 80. The substrate 12 may include additional screw holes or apertures for aligning with screw holes on auxiliary components thereby securing the auxiliary components to the substrate 12 with screws or other fasteners, and for additionally securing the interface 10 to a circuit breaker. The substrate 12 includes a base surface (not shown) that is in abutting relation with a base 86 of a circuit breaker 80 when installed, and a mounting surface 16 for mounting auxiliary components as will be described. The intermediate component assembly is preferably a plastic molded component, although materials, preferably insulating materials are within the scope of this invention.

The substrate 12 preferably comprises a generally rectangular external periphery 18 including a right side 20 and a left side 22 (depending on the view of the substrate 12), which correspond to sides of the circuit breaker which connect the load side to the line side of the breaker. Also, as shown, these sides 20, 22 correspond to shorter sides of the generally rectangular periphery 18. The external periphery 18 may further include a first side 24 and a second side 26. The first and second sides 24, 26 correspond to load and line sides of the circuit breaker, which may be interchangeable. The first side 24 may further include an extension 28, which may itself be generally rectangularly shaped. The extension 28 may support a portion of an auxiliary contact block 30, as will be further described.

Figure 2:
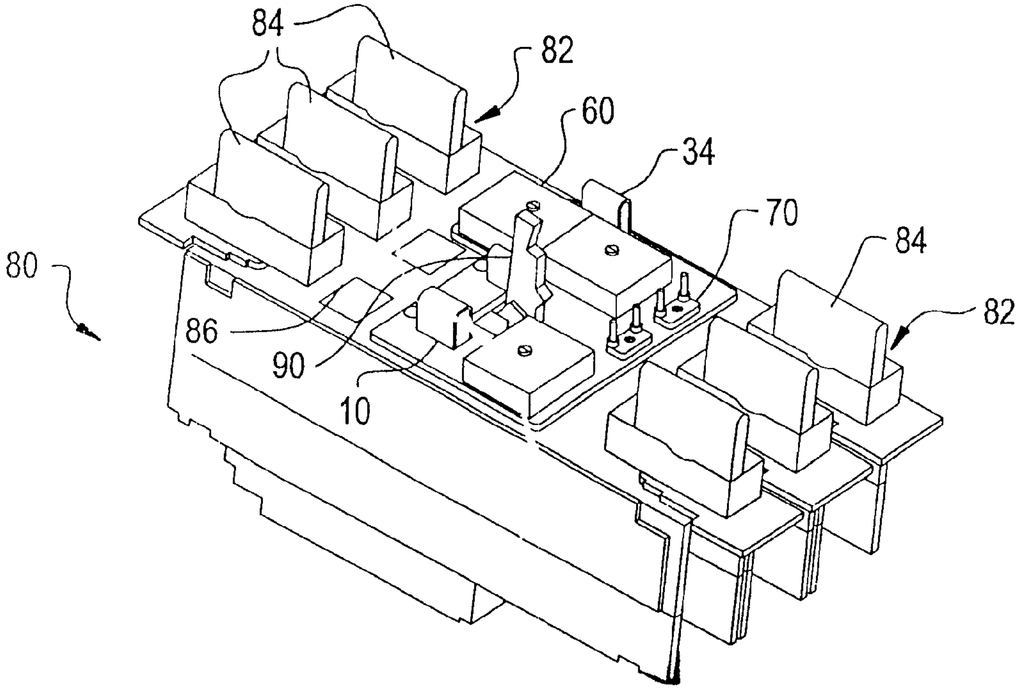

The substrate 12 may include an opening 32 for receiving protruding breaker components, such as a safety trip interlock assembly 90 shown in FIG. 2. The opening 32 as shown is larger than a screw aperture 14 for allowing such breaker components to pass. Although the opening 32 is shown as having a rectangular periphery, other peripheries are within the scope of the invention.

As further shown in FIG. 1, the substrate 12 may include protruding bridge-shaped features or passageways, shown collectively at 34, (having a tunnel-shaped appearance such as a generally upside-down U-shaped cross-section) which are adapted in size to accept and guide auxiliary wire routing. Each passageway 34, as shown, is adjacent the first side 24 of the substrate 12. These passageways 34 protrude from the mounting surface 16 and each include a first wall 36, a second wall 38, and a connecting wall 40. The first and second walls 36, 38 are preferably generally parallel to each other and generally perpendicular to the mounting surface 16. As shown, the first and second walls 36 and 38 are generally parallel to the right and left sides 20, 22 of the periphery 18 of the substrate 12 such that access portals 42, 44 face the first and second sides 24, 26 of the interface 10. The connecting walls 40 connecting the first walls 36 to the second walls 38 may be flat or curved. Portions 46 of the substrate 12 may be absent below each passageway 34 for ease of manufacture of the component. As shown, a first passageway 50, is shown nearer the left side 22, a third passageway 52 is shown nearer the right side 20, and a second passageway 54 is shown positioned between the first and third passageways 50, 52.

A very large number of up to 24 auxiliary contacts may be provided on the interface 10 as shown, although more or less auxiliary contacts may be utilized depending on the size of the breaker and as needed. Three auxiliary contact blocks, shown collectively as 60, each carrying eight auxiliary contacts, are shown fitted to the substrate 12. Numbers 1–8 on each contact block 60 indicate where contacts may be fitted. Screws 62 pass through the auxiliary contact blocks 60 and the substrate 12 to attach both to the circuit breaker base. A first auxiliary contact block 64 may be mounted adjacent the second side 26 and the left side 22 of the substrate 12. A second auxiliary contact block 66 may be mounted adjacent the right side 20 of the substrate 12 and between the second 54 and third 52 passageways. A third auxiliary contact block 30 may be mounted adjacent the right side 20 and first side 24 of the substrate 12 and upon the extension 28. The third auxiliary contact block 30 may be directly adjacent the second auxiliary contact block 66. With three passageways 34 and three contact blocks 60, the wires (not shown) leading to each contact block may pass through its own passageway 34. That is, for example, wires leading to auxiliary contact block 64 may be routed through passageway 50, wires leading to auxiliary contact block 66 may be routed through passageway 52, and wires leading to auxiliary contact block 30 may be routed through passageway 54.

Additional screw holes 14 may be provided in the substrate 12 for attaching rating plugs 70 as shown in FIG. 1. As with the auxiliary contact blocks 60, screws 62 may be used to secure the rating plugs 70 to both the substrate 12 as well as to the breaker base 86. Rating plugs 70 are generally provided to avoid insertion of a wrong breaker in a plug-in base. It is within the scope of this invention to provide up to eight rating plugs 70, although again, the number will depend on the allotted space and circuit breaker size and so more or less rating plugs 70 are also within the scope of this invention.

As shown in FIG. 2, a circuit breaker 80, to which the interface 10 of the present invention is mounted, is shown. The top (not shown) of the circuit breaker 80 may include an operating handle. The bottom or base 86 includes a surface for attaching the interface 10. Although the interface 10 of the present invention could be utilized with any suitable circuit breaker, the circuit breaker 80 shown is provided with a withdrawable contact arrangement (also referred to as a plug-in arrangement), as fully described in U.S. patent application Ser. No. 09/725,382, filed on Nov. 29, 2000, incorporated herein by reference. The contact arrangement comprises a fixed portion—notably a molded base provided with stationary contact assembly (not shown), and a movable part 82 (attached to the breaker 80 as shown), comprising a movable contact 84. The movable contacts 84 of the breaker 80 engage the stationary contacts when the circuit breaker 80 is in the plugged-in position. The breaker 80 can be moved between the plugged-in and the withdrawn positions. Along with the main contacts 84, the auxiliary circuit provided on auxiliary contact blocks 60 also gets automatically connected or disconnected, when the breaker 80 is plugged-in or withdrawn.

Thus, the introduction of an interface 10 provides additional surface to mount more auxiliary components, and makes their mounting easy and reliable. The interface 10 mounted on the base 86 of molded case circuit breaker 80 provides a surface 16 to which auxiliary contact blocks 60 and devices 70 for rating error prevention are mounted. Proper wire routing features 34 are also provided on the interface 10 to prevent the auxiliary circuit wires from interfering with the moving part coming out through opening 32. The wire routing also ensures that the wires do not get trapped between the circuit breaker and components mounted on the circuit breaker and the plug in base and components mounted on the plug-in base while the circuit breaker is being inserted into the plug in base. The use of the interfacing component 10 provides ease of location of the above mentioned components on the breaker base 86 and all the corresponding features required for mounting, and wire routing are provided on it which simplifies the breaker base 86, as well as facilitates the assembly of the components.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An auxiliary component interface for a circuit breaker, the interface comprising:

a substrate having a base surface adapted for attachment to a base of a circuit breaker, a mounting surface adapted for mounting auxiliary components, and an external periphery;

a passageway protruding from the mounting surface of the substrate, the passageway adapted to route auxiliary circuit wires;

a plurality of substrate screw apertures within the substrate adapted for accepting screws; and, an auxiliary contact block mounted to the mounting surface of the substrate, the auxiliary contact block adapted to carry a plurality of auxiliary contacts and having an auxiliary contact block screw aperture for aligning with one of the plurality of substrate screw apertures.

2. The interface of claim 1 further comprising a plurality of auxiliary contact blocks mounted to the mounting surface of the substrate.

3. The interface of claim 1 wherein the passageway is a tunnel-shaped protrusion.

4. The interface of claim 1 wherein the passageway has a generally U-shaped cross-section.

5. The interface of claim 1 further comprising a plurality of passageways protruding from the mounting surface of the substrate.

6. The interface of claim 1 further comprising a device for rating error prevention mounted to the mounting surface of the substrate.

7. The interface of claim 6 further comprising a plurality of devices for rating error prevention mounted to the mounting surface of the substrate.

8. The interface of claim 6 wherein the device includes a device screw aperture aligned with one of the plurality of substrate screw apertures.

9. A plug-in circuit breaker comprising:

a base;

a plurality of contacts on a line end and a plurality of contacts on a load end of the circuit breaker, the contacts extending from the base and adapted to engage with a set of stationary contacts when the circuit breaker is in a plugged-in position; and, an auxiliary component interface positioned between the line end and load end of the circuit breaker, the interface comprising a substrate having a base surface secured to the base of the circuit breaker and a mounting surface adapted for mounting auxiliary components, a passageway protruding from the mounting surface of the substrate of the interface, the passageway adapted to route auxiliary circuit wires.

10. The plug-in circuit breaker of claim 9 further comprising an auxiliary contact block mounted to the mounting surface of the substrate of the interface.

11. The plug-in circuit breaker of claim 10 further comprising a device for rating error prevention mounted to the mounting surface of the substrate of the interface.

12. The plug-in circuit breaker of claim 11 wherein the device and the auxiliary contact block are screwed to the substrate.

13. The plug-in circuit breaker of claim 9 further comprising a plurality of passageways protruding from the mounting surface of the substrate, each passageway having access portals facing the line and the load ends of the circuit breaker.

14. The plug-in circuit breaker of claim 9 further comprising three auxiliary contact blocks secured to the mounting surface of the substrate, each auxiliary contact block carrying eight auxiliary contacts.

15. An auxiliary component interface for a circuit breaker, the interface comprising:

a substrate having a base surface adapted for attachment to a base of a circuit breaker, a mounting surface adapted for mounting auxiliary components, and an external periphery;

a plurality of substrate screw apertures within the substrate adapted for accepting screws; and, at least one auxiliary contact block mounted to the mounting surface of the substrate, the at least one auxiliary contact block adapted to carry a plurality of auxiliary contacts and having an auxiliary contact block screw aperture for aligning with one of the plurality of substrate screw apertures;

wherein the substrate has a generally rectangular periphery with a right side, a left side, a first side, and a second side, the first side having a rectangular extension for supporting a portion of one of the at least one auxiliary contact block, the first side and the second side of the substrate adapted to be placed adjacent a load side or line side of the circuit breaker.

16. The interface of claim 15 wherein the substrate includes at least one passageway for routing auxiliary circuit wires.

17. The interface of claim 16 wherein the substrate includes three passageways adjacent the first side of the substrate, the passageways having access portals facing the fist side and the second side of the substrate.

18. The interface of claim 15 wherein the at least one auxiliary contact block comprises three auxiliary contact blocks, a first auxiliary contact block mounted adjacent the second side and the left side of the substrate, a second auxiliary contact block mounted adjacent the right side of the substrate and between a pair of passageways, and a third auxiliary contact block mounted adjacent the first side and the right side of the substrate and on the rectangular extension.

19. The interface of claim 18 further comprising a rectangular shaped opening within the external periphery of the substrate, the opening positioned between the first auxiliary contact block and the second auxiliary contact block.

20. The interface of claim 15 further comprising a pair of devices for rating error prevention.

21. An auxiliary component interface for a circuit breaker, the interface comprising:

a substrate having a base surface adapted for attachment to a base of a circuit breaker, a mounting surface adapted for mounting auxiliary components, and an external periphery;

a plurality of substrate screw apertures within the substrate adapted for accepting screws;

an opening within the external periphery of the substrate, the opening having larger dimensions than each of the plurality of substrate screw apertures, the opening adapted to allow the passage of a safety trip interlock assembly extending from a circuit breaker; and, at least one auxiliary contact block mounted to the mounting surface of the substrate, the at least one auxiliary contact block adapted to carry a plurality of auxiliary contacts and having an auxiliary contact block screw aperture for aligning with one of the plurality of substrate screw apertures.

22. A plug-in circuit breaker comprising:

a base;

a safety trip interlock assembly;

a plurality of contacts on a line end and a plurality of contacts on a load end of the circuit breaker, the contacts extending from the base and adapted to engage with a set of stationary contacts when the circuit breaker is in a plugged-in position; and, an auxiliary component interface positioned between the line end and load end of the circuit breaker, the interface comprising a substrate having a base surface secured to the base of the circuit breaker and a mounting surface adapted for mounting auxiliary components, and an opening in the substrate, wherein the safety trip interlock assembly passes through the opening.

* * * * *